(12) United States Patent
Shepshelovich et al.

(10) Patent No.: US 8,113,462 B2
(45) Date of Patent: Feb. 14, 2012

(54) LOW-DRAG SWEPT WINGS

(75) Inventors: Michael Shepshelovich, Ganey Tikva (IL); Anthony-Samuel Sznabel, Jerusalem (IL); David-Eli Levy, Netanya (IL)

(73) Assignee: Israel Aerospace Industries, Ltd., Lod (IL)

( * ) Notice: Subject to any disclaimer, the term of this patent is extended or adjusted under 35 U.S.C. 154(b) by 861 days.

(21) Appl. No.: 12/007,079

(22) Filed: Jan. 7, 2008

(65) Prior Publication Data

US 2008/0283674 A1 Nov. 20, 2008

Related U.S. Application Data

(60) Provisional application No. 60/879,028, filed on Jan. 8, 2007.

(51) Int. Cl.
*B64C 3/14* (2006.01)
(52) U.S. Cl. .................. 244/45 R; 244/35 R
(58) Field of Classification Search .............. 244/35 R, 244/45 R
See application file for complete search history.

(56) References Cited

U.S. PATENT DOCUMENTS

| | | | | |
|---|---|---|---|---|
| 4,641,796 A * | 2/1987 | Feifel | | 244/35 R |
| 4,718,619 A * | 1/1988 | Ashill et al. | | 244/35 R |
| 5,094,411 A * | 3/1992 | Rao | | 244/214 |
| 5,314,142 A * | 5/1994 | Rao et al. | | 244/35 A |
| 2006/0226283 A1* | 10/2006 | Shepshelovich et al. | | 244/35 R |

OTHER PUBLICATIONS

Harris, Charles D. "NASA Supercritical Airfoils: A Matrix of Family-Related Airfoils." NASA Technical Paper 2969. Mar. 1990.*
Henderson, William. "Effects of Wing Leading-Edge Radius and Reynolds Numbek on Longitudinal Aerodynamic Characteristics of Highly Swept Wing-Body Configurations At Subsonic Speeds." NASA Technical Note D-8361. Dec. 1976.*
Fletcher, Herman. "Low-speed experimental determination of the effects of leading-edge radius and profile thickness on static and oscillatory lateral stability derivatives for a delta wing with 60 degrees of leading-edge sweep." NACA Technical Note 4341. Jul. 1958.*
Abbott, I. H., et al., "Theory of Wing Sections", Dover Publications Inc., N. Y., 1959.
Drela, M., "Newton Solution of Coupled Viscous/Inviscid Multielement Airfoil Flows", AIAA 90/1470, AIAA Fluid Dynamics, Plasmodynamics and Laser Conference, Seattle, WA, Jun. 1990.

(Continued)

*Primary Examiner* — Tien Dinh
*Assistant Examiner* — Michael Kreiner
(74) *Attorney, Agent, or Firm* — The Nath Law Group; Susanne M. Hopkins; William L. Klima

(57) ABSTRACT

The invention relates to an aircraft, and a method for operating an aircraft, the aircraft having a longitudinally unstable configuration and swept wings, the swept wings being based on aerofoils having a leading edge and configured for preventing attachment line transition in conditions of laminar flow over the swept wing for at least a predetermined first range of lift coefficients at a second range of Reynolds numbers. The invention also relates to an aerofoil, and to a method for providing an aerofoil, the airfoil being configured for a thick-sectioned subsonic/transonic swept wing, having a curved leading edge, a trailing edge, a thickness dimension and a chord dimension, wherein the leading edge comprises a leading edge curvature associated with a leading edge radius that is configured for preventing attachment line transition in conditions of laminar flow over the swept wing.

16 Claims, 13 Drawing Sheets

OTHER PUBLICATIONS

Drela, M., "A User's Guide to MSES V2.6", MIT Computational Aerospace Laboratory, May 1994.

Steinbuch, M., et al., "Development of UAV Wings—Subsonic Designs", $41^{st}$ Aerospace Sciences Meeting and Exhibit, Reno, NV, Jan. 6-9, 2003.

Steinbuch, M., et al., "Development of UAV Wings—Transonic Designs", $43^{rd}$ Aerospace Sciences Meeting and Exhibit, Reno, NV, Jan. 10-13, 2005.

Poll, D. I. A., "Transition in the Infinite Swept Attachment Line Boundary Layer", The Aeronautical Quart., vol. 30, pp. 607-629, (1979).

Viswanath, P. R., et al., "Relaminarization on Swept Leading Edges under High-Lift Conditions", $42^{nd}$ Aerospace Sciences Meeting and Exhibit, Reno, NV, Jan. 5-8, 2004.

Nathman, J. K., "VSAERO User's Manual", Analytical Methods, Inc, Redmond, WA, May 2003.

Steinbuch, M., et al., "Laminarization of the Swept Wing—the Design Aspects", $36^{th}$ Israel Annual Conference on Aerospace Science, Feb. 1996.

Levy, D-E., et al., "The Concept of Unstable Swept NLF Wing", $47^{th}$ Israel Annual Conference on Aerospace Sciences, Feb. 21-22, 2007.

* cited by examiner

LOW-DRAG SWEPT WINGS

This application claims the benefit of prior U.S. provisional patent application No. 60/879,028, filed on Jan. 8, 2007, the contents of which are hereby incorporated by reference in their entirety.

FIELD OF THE INVENTION

This invention relates to aircraft configurations and to wing configurations and aerofoil sections for aircraft.

BACKGROUND OF THE INVENTION

Laminarization of lifting surfaces, such as for example the wings of an aircraft, may provide reduced parasite drag of the wings and improvement of aerodynamic efficiency of the aircraft, wherein skin friction at laminar flow is much less than for fully turbulent flow for a given Reynolds number (Refs. 1-3). Extended laminarization, particularly of relatively thick wing sections at relatively high Reynolds numbers may be attributed to the favorable accelerating pressure gradient at the forward portion of the aerofoil and its beneficial effect on stability of the laminar boundary layer. At the lift coefficients associated with the laminar bucket, the effect of aerofoil flow laminarization produces a reduction of about 50% of the parasite drag of the aerofoil, which may potentially provide a reduction of required thrust and improved mission performance.

For unswept wings, the mechanism of laminar-turbulent transition is dominated by Tolmin-Schlihting (TS) instability of laminar boundary layers and is dependent on Reynolds number, pressure gradients, free-stream turbulence and surface quality.

While laminarization of lifting surfaces may significantly reduce parasite drag and improve aerodynamic efficiency of air vehicles, realization of this goal in the case of swept wings generally require substantial design efforts for avoiding 3-D instabilities of laminar boundary layers, including cross flow instability and attachment line transition. These instabilities may produce premature transition to turbulent flow at the forward portion of the wing sections. While some conventional NACA aerofoils comprise small leading edge radii that could be advantageous for prevention of attachment line transition when used for swept wings, these aerofoils also have reduced thickness ratio, which in turn provides relatively inferior lift-carrying capabilities.

However, for practical applications in which thick wing sections are of interest, because of physical space requirements for internal installations and storing wing internal fuel for example, aerofoils having high thickness ratio are conventionally provided with a relatively large leading edge radius, which is in conflict with principles of wing laminarization with respect to attachment line transition, if such aerofoils are used for swept wings, particularly at high Reynolds numbers.

SUMMARY OF THE INVENTION

According to a first aspect of the invention an aerofoil is provided for a thick-sectioned subsonic/transonic swept wing, the aerofoil comprising a curved leading edge, a trailing edge, a thickness dimension and a chord dimension, wherein said leading edge comprises a leading edge curvature associated with a leading edge radius that is configured for preventing attachment line transition in conditions of laminar flow over the swept wing.

In at least some embodiments, the leading edge comprises a leading edge radius having a local leading edge radius that is not greater than about 0.5% of said chord dimension. For example, the leading edge radius may be substantially constant along said leading edge. Optionally the leading edge radius may be not greater than about 0.5% of said chord dimension. Alternatively, the leading edge radius may be not greater than about 1% of said chord dimension. Alternatively, the leading edge radius may be variable along said leading edge, and optionally, the leading edge radius may comprise a local leading edge radius between about 0.1% and about 1% of said chord dimension.

At least for some embodiments, the thickness dimension (t) may be between about 5% and about 13% of said chord dimension (c), and the leading edge radius (r) is related to said thickness dimension (t) and said chord dimension (c) by the expression:

$$r \leq [(t/c) - 0.05]/8$$

Alternatively, the thickness dimension (t) may be greater than about 13% of said chord dimension (c), and said leading edge radius (r) may be about 1% or less than about 1% of said chord dimension. Alternatively, the thickness dimension (t) may be greater than about 13% of said chord dimension (c), and said leading edge radius (r) may be about 0.5% or less than about 0.5% of said chord dimension.

At least for some embodiments, the thickness dimension may be not less than about 8% of said chord dimension, and said leading edge radius is substantially smaller than a leading edge radius of a corresponding conventional datum aerofoil of substantially the same thickness to chord ratio.

At least for some embodiments, the leading edge curvature extends about 60° with respect to a center of said curvature.

The aerofoil may further comprise a protection region on a suction surface of said aerofoil and joined to said leading edge downstream of said leading edge, wherein said protection region is configured for preventing or minimizing fast flow acceleration at the leading edge and formation of a sharp suction peak with increasing angle of attack for the aerofoil. Optionally, the protection zone extends downstream of said leading edge by about 30° with respect to a center of said curvature.

At least for some embodiments, the aerofoil is designed for a swept wing having a sweep angle $\Lambda$, and said leading edge radius (r) is determined from the expression:

$$\overline{R} = \sin\Lambda \sqrt{\frac{Re}{2\cos\Lambda} \times \frac{r}{c}}$$

wherein $\overline{R}$ is the attachment line parameter, Re is the Reynolds number and c is the aerofoil chord dimension, said attachment line parameter having a value not greater than a critical value corresponding to onset of turbulent flow along the attachment line. For some embodiments, the surface of the swept wing has a predetermined critical roughness, and wherein $\overline{R}$ has a value of about 245. For some embodiments, the surface of the swept wing has a generally polished finish, and $\overline{R}$ has a value of between about 500 and about 600.

At least for some embodiments, the aerofoil may have a design Reynolds number greater than about $10^6$.

According to this aspect of the invention, a subsonic/transonic swept wing may be provided, based on aerofoils as defined herein. For example, the swept wing may have a positive sweep angle at a leading edge thereof and at a trailing edge thereof, or the swept wing may be a delta wing. An air vehicle may also provided comprising the swept wings as defined herein, and the air vehicle may comprise an unstable aircraft configuration. The aircraft may be configured for operating at low drag conditions and at laminar flow conditions for a range of aircraft lift coefficients.

The first aspect of the invention is also directed to a corresponding method for providing an aerofoil for a thick subsonic/transonic swept wing, comprising providing a leading edge curvature for the aerofoil associated with a leading edge radius that is configured for preventing attachment line transition in conditions of laminar flow over the swept wing.

According to a second aspect of the invention, an aircraft is provided comprising a longitudinally unstable configuration and swept wings, wherein said swept wings are based on aerofoils that are configured for preventing attachment line transition in conditions of laminar flow over the swept wing for at least a predetermined first range of lift coefficients at a second range of Reynolds numbers.

The swept wings may be as defined for the first aspect of the invention, for example, and thus the wings may be based on aerofoils as defined for the first aspect of the invention.

For example, the leading edge may comprise a local leading edge radius that is not greater than about 0.5% of said chord dimension. For example, the aerofoil may have a thickness dimension (t) between about 5% and about 13% of said chord dimension (c), and a leading edge radius (r) that is related to said thickness dimension (t) and said chord dimension (c) by the expression:

$$r \leq [(t/c) - 0.05]/8$$

Alternatively, the aerofoil may have a thickness dimension (t) greater than about 13% of said chord dimension (c), and said leading edge radius (r) is about 1% or less than about 1% of said chord dimension.

In at least some embodiments, the leading edge has a curvature that extends about 60° with respect to a center of said curvature.

Optionally, there may be provided a protection region on a suction surface of said aerofoil and joined to said leading edge downstream of said leading edge, wherein said protection region is configured for preventing or minimizing fast flow acceleration at the leading edge and formation of a sharp suction peak with increasing angle of attack for the aerofoil. Optionally, the protection zone extends downstream of said leading edge by about 30° with respect to a center of said curvature.

The swept wings may have a sweep angle Λ, and the minimum leading edge radius (r) is determined from the expression:

$$\overline{R} = \sin\Lambda \sqrt{\frac{Re}{2\cos\Lambda} \times \frac{r}{c}}$$

wherein $\overline{R}$ is the attachment line parameter, Re is the Reynolds number and c is the aerofoil chord dimension, said attachment line parameter having a value not greater than a critical value corresponding to onset of turbulent flow along the attachment line.

In at least some embodiments, the surface of the swept wings have a predetermined critical roughness, and wherein $\overline{R}$ has a value of about 245. In at least some embodiments, the surface of the swept wings may have a generally polished finish, and $\overline{R}$ has a value of between about 500 and about 600.

Furthermore, the aircraft may be configured for providing an extended range of said lift coefficients by providing suitable deflections of wing flaps and maintaining the aircraft in a trimmed condition. The aircraft may be configured for providing said extended range of said lift coefficients while maintaining an angle of attack of the wing generally close to the angle of attack at the design lift coefficient.

According to the second aspect of the invention, there is also provided a method for operating an aircraft, comprising providing said aircraft having a longitudinally unstable configuration and swept wings, wherein said swept wings are based on aerofoils that are configured for preventing attachment line transition in conditions of laminar flow over the swept wing for at least a predetermined first range of lift coefficients at a second range of Reynolds numbers, and flying said unstable aircraft at low drag conditions at least at said second range of Reynolds numbers.

The method may further comprise extending said first range of said lift coefficients by providing suitable deflections of wing flaps comprised in said swept wings and maintaining the aircraft in a trimmed condition for said second range of Reynolds numbers, and flying said unstable aircraft at low drag conditions at least at said second range of Reynolds numbers.

The first range of said lift coefficients may be extended while maintaining an angle of attack of the wing generally close to the angle of attack at a design lift coefficient of said aircraft.

The method according to the second aspect of the invention may include providing swept wings as defined for the first aspect of the invention, for example, and thus the wings may be based on aerofoils as defined for the first aspect of the invention.

A corresponding method for designing an aircraft, comprising configuring said aircraft to have a longitudinally unstable configuration and swept wings, wherein said swept wings are based on aerofoils that are configured for preventing attachment line transition in conditions of laminar flow over the swept wing for at least a predetermined first range of lift coefficients at a second range of Reynolds numbers, and for enabling flying said unstable aircraft at low drag conditions at least at said second range of Reynolds numbers.

A feature of at least some embodiments of the invention is that, while evaluation of cross-flow instability requires development of sophisticated mathematical methods, estimation of attachment line transition relies on the relatively simple criteria based on the local radius at attachment line location.

While in general, small leading edge radius may be advantageous for prevention of attachment line transition, such leading edge geometries in the prior art generally effect adversely lift-carrying capabilities of the corresponding wing sections. Moreover, with increasing/decreasing angles of attack, the attachment line tends to move rapidly to the regions of reduced curvature, limiting domain of laminar flow to the narrow "corridor" of lift coefficients.

In the present invention, relatively thick (NLF) aerofoils are provided with relatively small leading edge radius and an aerofoil geometry that provide reasonable range of lift coefficients associated with laminarized flow. In particular, a new class of aerofoils is provided for swept wings, comprising an unconventional combination of small leading edge radius and high thickness ratio, which provide laminarization of thick swept lifting surfaces with respect to AL-transition. In some embodiments, the laminarized flow regime may be extended by designing the swept NLF wing for use with an aircraft configuration that is unstable in the longitudinal plane, enabling the location of attachment line to be maintained at the leading edge of the aerofoils for both increasing and decreasing angles of attack. The novel approach in development of swept NLF wings according to the invention also enables in at least some cases extension of the limits of wing laminarization to higher Reynolds numbers without compromising on the range of allowable cruise lift coefficients for low drag flight.

According to aspects of the invention:

Swept NLF wing sections may be designed with acceptable combined laminarization limits at high Reynolds numbers. Extension of AL-instability limit to high Reynolds numbers may be possible, while providing acceptable laminarization limits with respect to all types of instabilities of laminar boundary layers.

A specific SNLF-aerofoil is disclosed herein, providing a case study of aerodynamic characteristics of thick aerofoils with small leading edge radius. The combination of relatively thick aerofoils with relatively small leading edge radius according to the invention is in contrast with conventional trend in definition of wing sections that imply large leading edge radius for high thickness ratio aerofoils.

In some embodiments, a specially shaped protection area was developed and integrated with forward portion of the aerofoil above the region of small leading edge radius. This can serve to moderate flow acceleration around leading edge of the aerofoil and can prevent formation of sharp suction peak with increase of angle of attack, helping to avoid unfavorable stall characteristics and deterioration of maximum lift due to small leading edge radius.

Small leading edge radius of SNLF-aerofoil according to the invention may help to extend AL-limit of this wing section to domain of high Reynolds numbers. This can be achieved for a narrow range of lift coefficients around primary design point, forming an "AL-corridor" for allowable Reynolds numbers and these lift coefficients.

According to another aspect of the invention, it is possible to extend the allowable range of lift coefficients for low drag flight at high Reynolds numbers, covering many or all required stages of a mission. A main feature of these embodiments is limited travel of attachment line with increasing/decreasing lift coefficient around the leading edge region of small leading edge radius. This may be achieved by providing swept wings to an unstable aircraft configuration, benefiting from the limited change of the flight angles of attack for the trimmed configuration and exploiting the resulting favorable location/travel of attachment line in the region of small leading edge radius. The level of instability of complete configuration required for realization of the concept can be estimated for every specific case, complying with standard requirements of acceptable stability and control characteristics in design of unstable configurations. Thus, at least some embodiments of the invention comprising a combination of small leading edge radius and large thickness, incorporated in the swept wing design of unstable aircraft configurations, provide flexibility in design of low-drag swept NLF wing at domain of high Reynolds numbers, without the need to compromise on allowable flight envelope.

For design work on specific swept wing configurations, the AL-limit can be adjusted to the actual CF-limit, resulting in perhaps more moderate values of leading edge radius and compatible combined laminarization limits with respect to all types of instabilities of laminar boundary layers.

The concept of thick aerofoils with reduced leading edge radius according to the present invention may be applied to design of swept wings with different sweepback angles (positive or negative, i.e., including swept-back and swept-forward wings, respectively), thickness ratio, design lift coefficients and Reynolds numbers, extent of laminarization and zero lift pitching moment. An extended evaluation on variation of these design parameters may produce a family of SNLF-aerofoils and summary of their characteristics in the form of aerodynamic data base.

Herein, "wing" includes any lifting surface and/or control surface of an aircraft, including for example the main aircraft wings, tail, fins, canards, and so on.

The present invention also relates to an air vehicle comprising swept wings according to the invention. The swept wings may be the main lift-producing wings of said air vehicle, or the tail, fins, canards, and so on thereof. For example, the air vehicle may be an Unmanned Air Vehicle (UAV), in particular adapted for long range endurance and loitering, or may include any suitable manned aircraft.

According to an aspect of the invention, the thickness to chord ratio of the aerofoil is relatively greater than that of conventional aerofoils, in particular for a leading edge radius that is less than about 1% of the chord. According to another aspect of the invention, the leading edge radius is relatively less than that of conventional aerofoils for thickness-to-chord ratios of at least 8% or greater than 8%.

In some embodiments, the leading edge portion is circular, having a substantially uniform radius throughout, the radius being less than about 1% of the chord. In other embodiments, the leading edge portion may be curved, though non-circular, for example having the shape of part of an ellipse or other type of curve, but where the curvature is such that it corresponds to a variable radius that is in a range from just above about 0% to about 1% of the chord. Accordingly, the term "leading edge radius" is used herein to refer to both a real uniform radius, and also to a measure of the variable curvature of a curved surface, for example the maximum, median or mean curvature thereof.

At least some embodiments of the swept wing sections according to the invention may comprise one or more of the following features, and may include laminarization at high Reynolds numbers:

Increased thickness in order to comply with requirements of sufficient internal volume for efficient structure, installations and wing internal fuel Small leading edge radius for delay of attachment line transition to high Reynolds numbers. (in conflict with high thickness ratio and requirement for acceptable values of maximum lift)

Capability to achieve extended wing laminarization at high Reynolds numbers in acceptable range of lift coefficients Design for combined laminarization limits, complying with requirements of attachment line transition, cross flow instability and transition due Tolmien-Schlichting waves Acceptable values of maximum lift for the cases of laminar and fully turbulent aerofoils Capability to operate at the medium transonic Mach numbers

BRIEF DESCRIPTION OF THE DRAWINGS

In order to understand the invention and to see how it may be carried out in practice, embodiments will now be described, by way of non-limiting example only, with reference to the accompanying figures, in which.

| NOMENCLATURE | | | |
|---|---|---|---|
| $C_L$ | aircraft lift coefficient | α | angle of attack |
| $C_l$ | aerofoil lift coefficient | $δ_{flap}$ | flap deflection |
| $C_d$ | aerofoil drag coefficient | AR | aspect ratio |
| $C_p$ | pressure coefficient | AL | attachment line |
| $C_f$ | skin friction | CF | cross flow |
| $C_m$ | aerofoil pitching moment | H | altitude |
| $C_{m0}$ | zero lift pitching moment | HA | high altitude |
| $N_{CF}$ | cross-flow amplification factor | K | leading edge curvature |
| r | leading edge radius | L/D | aerodynamic efficiency |
| $r_l$ | local radius normal to L.E. | | |
| $z_c$ | camber fraction | L.E. | leading edge |
| Re | Reynolds number | M | Mach number |
| t/c | thickness ratio | NLF | natural laminar flow |
| x/c | chord fraction | SNLF | swept NLF wing |
| Λ | wing sweep angle | TS | Tolmin-Schlihting |
| $\overline{R}$ | attachment line parameter | UAV | unmanned air vehicle |

DETAILED DESCRIPTION OF EMBODIMENTS

Figure 1:
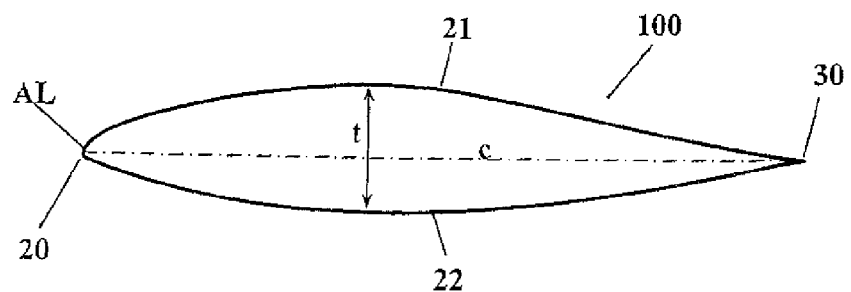
FIG. 1 is a schematic side view of an aerofoil according to one embodiment of the invention.

According to a first embodiment of the invention, and referring to FIG. 1, a Swept Natural Laminar Flow aerofoil (also referred to herein as an SNLF-type aerofoil) is provided, generally designated 100, comprising leading edge 20, suction surface 21, pressure surface 22, and trailing end 30, and the aerofoil 100 also defines a chord c and maximum thickness t.

Aerofoil 100 may be provided for any suitable subsonic or transonic swept wings, for example high lift wings of an aircraft, in particular fixed wing aircraft (including variable geometry winged aircraft, including for example "swing winged" aircraft). For the purpose of example, such an aircraft is described herein as a fixed-wing aircraft, comprising a regular subsonic/transonic configuration, having a fuselage section, main wings, tailplane, vertical stabilizer, and a propulsion system, but may instead include, mutatis mutandis, any other type of aircraft, for example: flying wing configurations, rotor-wing aircraft including helicopters; subsonic/transonic aircraft having canards rather than a tailplane; general aviation aircraft, cruise missiles or other air-delivered ordinance, and so on.

Figure 2:
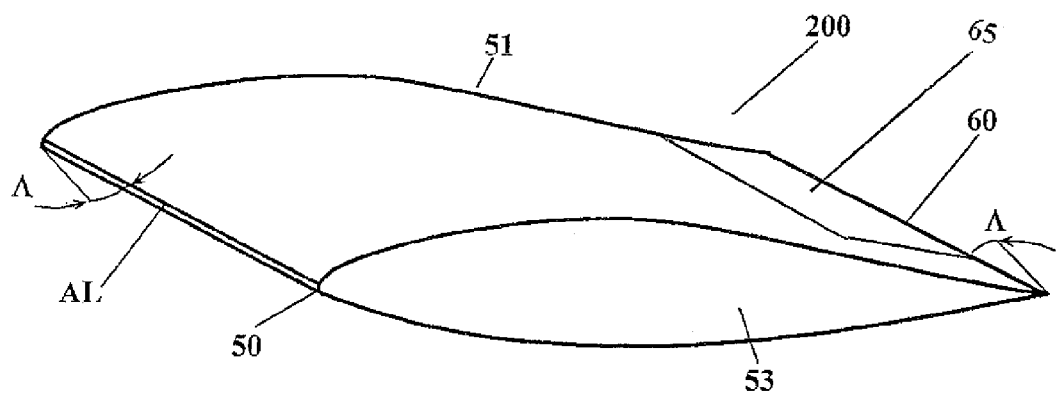
FIG. 2 is an isometric view of a swept wing section based on the aerofoil of FIG. 1.

Referring to FIG. 2, and by way of non-limiting example, a wing element 200 of a swept back wing is illustrated, based on aerofoil 100, the wing element having for example a substantially parallelepiped plan shape. In variations of this embodiment, the wing may be a delta wing, for example. In any case, the wing element 200 may comprise a portion of the span of the wing, or the full span of the wing (port and/or starboard) of the aircraft.

In this embodiment, the leading edge 50 of the wing element 200, which coincides with the leading edge 20 of the aerofoil 100, is substantially rectilinear and has a positive sweep angle Λ. The wing element 200 is illustrated having a taper of about 1.0, between the two lateral ends thereof, referred to as the root 51 and the tip 53. The trailing edge 60 of the wing element 200, which coincides with the trailing edge 30 of the aerofoil 100, is also substantially rectilinear and comprises a substantially similar sweep angle Λ. In other variations of this embodiment, the wing element 100 may have a different plan form, for example: different swept-back angles for the leading edge and the trailing edge; a swept forward configuration (with the same or different negative sweep angles for the leading edge and trailing edge); and/or with a different taper ratio (along the full wing, or different taper ratios for different wing elements); and/or having a curved leading edge and/or a curved trailing edge; and/or at least some portion of the wing may have a positive, negative or zero dihedral angle; and so on.

Referring again to FIG. 2, the wing element 200 may comprise control surfaces such as for example ailerons or flaps 65, and so on, that are pivotable with respect to the wing element 200.

Figure 3:
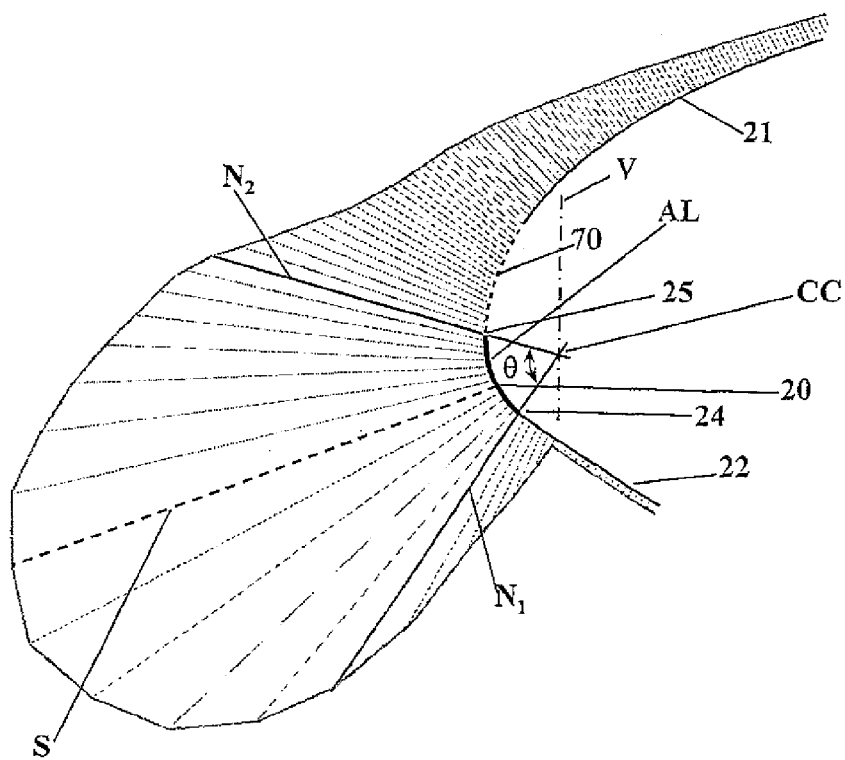
FIG. 3 shows details of the leading edge and portions of the suction surface and pressure surface extending therefrom of the embodiment of FIG. 1, including the distribution of local curvature ($1/r_l$) along the leading edge of the aerofoil and said portions the suction surface and pressure surface.

The attachment line AL is generally defined as the line along the leading edge 50 of the wing element 200, or the corresponding point on the leading edge 20 of aerofoil 100 (also referred to herein as the stagnation point of the aerofoil), which separates the flow over the pressure surface 22 from the flow over the suction surface 21, and the attachment line corresponds to a separation streamline S (FIG. 3).

Referring also to FIG. 3, the leading edge 20 comprises a leading edge radius r defining a leading edge curvature K (=1/r). In this embodiment the local curvature K, and the local leading edge radius, vary along the leading edge 20, and a center of curvature CC for the leading edge may be defined in any number of ways. For example, the center of curvature CC may be defined as the center of a circle having a radius corresponding to the mean or median curvature taken along the leading edge 20. Alternatively, the center of curvature CC may be defined as the point of intersection of normals N1, N2, taken at the surface of the aerofoil 100 at the pressure surface end 24 and at the suction surface end 25, respectively, of the leading edge 20. The peripheral extent of the leading edge 20 may be defined as between the two positions on the aerofoil periphery of the attachment line AL corresponding to a maximum angle of attack and a minimum angle of attack for the aerofoil 100. For example, the aforesaid maximum angle of attack may correspond to the angle of attack at which the coefficient of lift $C_l$ of the aerofoil is maximum, and the minimum angle of attack may correspond to the angle of attack at which the coefficient of lift $C_l$ is zero.

Optionally, the peripheral extent of the leading edge 20 along the profile of the aerofoil 100 may also be defined according to any suitable angular system with respect to a center and a datum line. For example, and referring to FIG. 3, the aforesaid peripheral extent may be defined with reference to the relative angular displacement θ between the pressure surface end 24 and at the suction surface end 25, taken along the center of curvature CC. Furthermore, an imaginary datum line V intersecting the center of curvature CC may chosen to represent zero degrees, and the actual angles subtended to the center of curvature CC measured in an anticlockwise manner, for example, from this datum line. In FIG. 3, this imaginary datum line V is chosen, by way of example, as being orthogonal to the chord c of the aerofoil, though any other datum line may be used. Thus, in the illustrated embodiment the leading edge 20 extends through about 60°, between a position at about 90° and a position at about 150° in the example illustrated in FIG. 3. The suction surface 21 and the pressure surface 22 starts at the suction surface end 25 and the pressure surface end 24, respectively, of the leading edge 20 and each extends downstream up to the trailing edge 30. These angular positions are also referred to herein as elevations.

In variations of this embodiment, the leading edge radius and curvature, are substantially constant along the leading edge, which define a corresponding center of curvature.

In this embodiment, the thickness to chord ratio of the aerofoil 100 is greater than about 13%, with the leading edge 20 having a local leading edge radius less than about 1% of the chord along the extent of the leading edge 20. In variations of this embodiment, and for a thickness to chord ratio of the aerofoil at or less than about 13% the leading edge radius is less than r for a thickness to chord ratio, wherein r (as a percentage of chord) is given by the expression:—

$$r=[(t/c)-5]/8$$

where t/c is the thickness to chord ratio, expressed as a percentage.

The critical Reynolds number for laminar-turbulent transition at the attachment line AL may be obtained from an attachment line parameter $\overline{R}$, using the following relationship:

$$\overline{R} = \sin\Lambda \sqrt{\frac{Re}{2\cos\Lambda} \times \frac{r_l}{c}} \qquad (1)$$

Figure 4A:
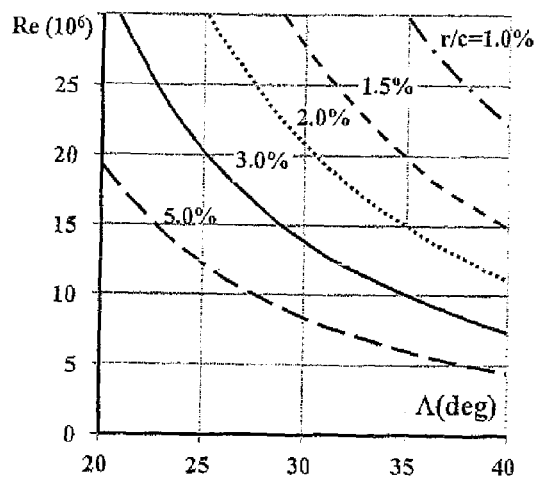
FIG. 4(a) illustrates variations of Reynolds numbers with sweep angle for a range of radius/chord ratios.

A burst of turbulent flow along attachment line occurs once attachment line parameter $\overline{R}$– exceeds a critical value. Such a critical value for the attachment line parameter $\overline{R}$ for many practical cases may be about 245, for example, for conditions in which some critical value of surface roughness is exceeded, which triggers onset of turbulent flow. Thus, for a particular leading edge radius r and wing sweepback angle Λ, the critical Reynolds number for attachment line transition, i.e., the maximum Reynolds number for preventing instability of the attachment line, may be determined, based on criteria of $\overline{R}$=245, or another suitable value. In FIG. 4(*a*), variations of critical Reynolds number with sweep angle for a number of leading edge radius/cord ratios are provided. Conversely, for a specific Reynolds number and wing sweep angle Λ, the maximum allowable local leading edge radius r, at the attachment line AL, for a given chord c, may be derived, defining a corresponding laminarization limit due to attachment line transition.

Figure 4B:
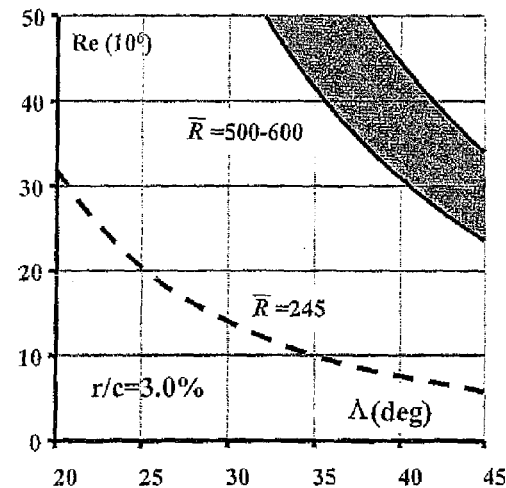
FIG. 4(b) illustrates the effect of attachment line parameter value on the variation of Reynolds numbers with sweep angle for a radius/chord ratio of 3%.

Alternatively, for very clean lifting surfaces (polished aluminium wind tunnel models, for example), attachment line transition may occur at higher values of attachment line parameter $\overline{R}$, for example in the range of between about 500 to about 600. It is to be noted that similar values for the attachment line parameter of between about 500 to about 600 may also be achieved for practical surfaces having surface roughness, for example as above, but where relaminarization of turbulent boundary layer occurs in strong accelerating pressure gradient at the leading edge of the aerofoil after the burst of turbulent flow at attachment line (Ref. 7). Accordingly, in practical terms, there may be in some cases a degree of uncertainty in evaluating the critical Reynolds number/leading edge radius/sweep angle for attachment line transition, and FIG. 4(b) illustrates for one case of leading edge radius/chord ratio the large variation in the value of critical Reynolds number that may be estimated for $\overline{R}=245$ and $\overline{R}\sim500\text{-}600$ for a given sweep angle.

At least for this embodiment, the leading edge 20 extends towards the suction surface 21 and the pressure surface 22 sufficiently to take account of movement of the attachment line AL along the periphery of the aerofoil 100 with a particular range of angle of attack, and thus corresponding lift coefficient $C_1$. In one example, said range may be the range expected to be needed during a particular mission or a part thereof, for example a low drag loiter part of a mission.

Figure 5:
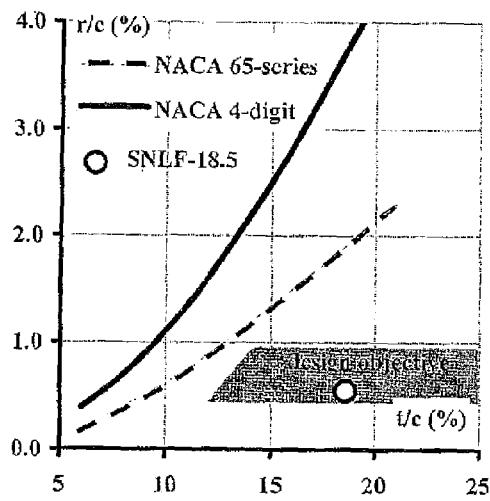
FIG. 5 compares relationships between leading edge radius and thickness.
Figure 6:
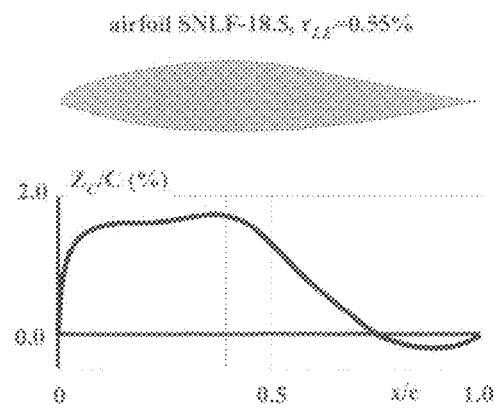
FIG. 6(a) illustrates the geometric profile and camber fraction of example aerofoil SNLF-18.5.
FIG. 6(b) illustrates pressure coefficient obtained with the aerofoil of FIG. 6(a).
Figure 6:
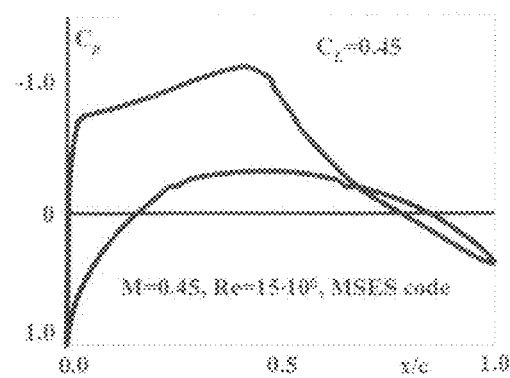
Figure 7:
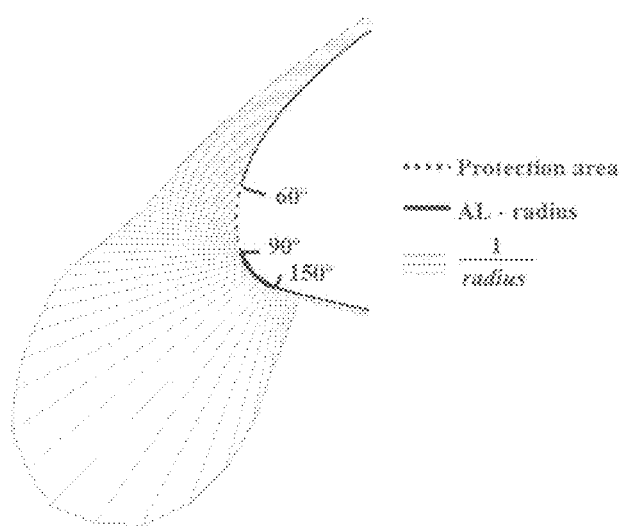
FIG. 7(a) illustrates geometrical details of a leading edge portion of the aerofoil of FIG. 6(a), including the leading edge and portions of the suction surface and pressure surface extending therefrom.
FIG. 7(b) illustrates the variation of local leading edge radius with elevation with respect to the center of curvature of the leading edge.
Figure 7:
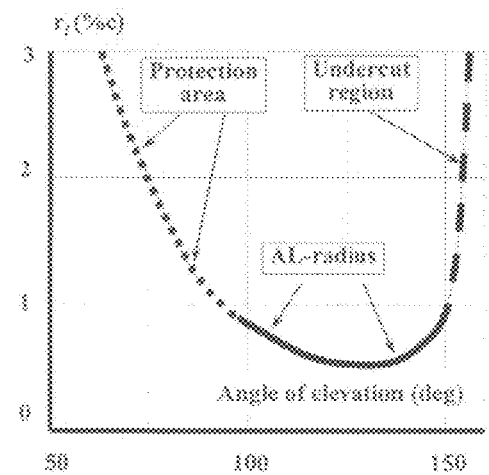

The aerofoil 100 provides an unconventional combination of relatively small leading edge radius r (which may be variable or constant) and relatively large thickness ratio t/c (for example leading radius to chord ratios of about 1% or less, coupled with thickness ratios of between about 8% and about 13%, or higher). This low radius-high thickness combination when applied to swept wings extends the laminarization limits due to attachment line transition to relatively high Reynolds numbers, similar to conventional airfoils having a relatively small leading edge radius, but small thickness ratio and in contrast to conventional large thickness to chord ratio airfoils having a relatively large leading edge radius that prevents laminarization at high Reynolds numbers because of AL-transition (FIG. 5). The combination of small leading edge radius and large thickness ratio of SNLF airfoils is applicable to subsonic and transonic swept NLF wings and to the wings designed for different levels of design lift coefficients.

Referring to FIG. 3 an optional design feature of aerofoil 100 is the provision of what is referred to herein as a protection region 70 at the upstream portion of the suction surface 21, contiguous with the end 25 of the leading edge 20. The protection region 70 is configured to provide a gradual decrease of surface curvature from the high curvatures of the leading edge to eventually blend with the relatively low curvature of the adjoining portion of the suction surface 21, for preventing or at least minimizing of fast flow acceleration at the leading edge 20 and formation of a sharp suction peak with increasing angle of attack. The specific downstream extent and curvature distribution of the protection region 70 may be designed in each specific case for achieving a rounded pressure distribution at the forward portion of the aerofoil 100 that may be desirable for providing increased load-carrying capabilities of the wing element 200 and for improving maximum lift characteristics, thereby avoiding suction peaks.

Optionally the protection area 70 comprises a variable local radius (which may be defined as the inverse of the local curvature at the corresponding point on the aerofoil periphery) of between about 0.3% and about 3% or about 4% of the chord, for example. Further optionally, the protection area 70 may extend to an elevation of between about 50° and about 110°, for example through 60°, for example, with reference to the angular system described above for the leading edge 20. According to the invention, for swept natural laminar flow (NLF) wings, transition to turbulent flow at the attachment line AL is avoided, preventing the loss of laminar flow on both upper and lower surfaces of the wing.

Aerofoil 100 may be designed or generated in a number of ways. For example, it is possible to start with a known baseline aerofoil design that may be close in characteristics to that required, for example having the required camber, thickness to chord ratio, and so on. Alternatively, a baseline aerofoil may be first designed according to the regular criteria to provide the desired performance to the aerofoil, while also providing the required thickness ratio and chord, which may be constrained to enable fuel tanks or equipment of a particular size to be accommodated therein, for example. The basic aerofoil design may be determined using a datum leading edge radius which is conventionally consistent with the other design parameters of the aerofoil, or where possible a smaller radius may be used, approaching as closely as possible the minimum local leading edge radius required for preventing attachment line transition.

Then, the baseline aerofoil contour may be modified to provide a relatively sharp leading edge (with a corresponding minimum leading edge radius) with attachment line located at the region of small leading edge radius at design lift conditions, and a suction surface that is cambered and/or has a thickness distribution as required to provide the required aerodynamic and structural characteristics.

This minimum leading edge radius is in any case determined, taking into account the desired sweep angle, based on formula (1) above, and assuming an attachment line parameter $\overline{R}$ of about 245, for example, though any other suitable value may instead be chosen for the attachment line parameter according to the specific requirements for the aerofoil and swept wing being designed. Then, the peripheral extent of the leading edge may be determined, according to the expected displacement of the attachment line along the aerofoil periphery with variation in angle of attack and lift coefficient, and the local leading edge radius is maintained at the calculated value, or less, for the peripheral extent of the leading edge. In some cases, it may be appropriate to taking into account whether the aircraft, onto which the wing element based on the aerofoil is to be mounted, comprises an unstable configuration (see below in connection with FIGS. 22(a) to 26).

Particularly for cases in which the leading edge radius of the baseline aerofoil is larger than the aforesaid minimum leading edge radius, the upstream profile of each of the pressure surface 22 and of the suction surface 21 is geometrically blended to the respective edge 24, 25 of the leading edge 20 in any suitable manner, the new leading edge 20 replacing the leading edge of the baseline aerofoil. Optionally, a protection region may be provided at the upstream portion of the suction surface to provide a particular desired rounded pressure distribution, corresponding to a desired lift performance. Then a number of iteration loops may be conducted, and in each loop, the profile associated with the blending of the leading edge 20 to the pressure surface 22 and the suction surface 21 is modified by a predefined increment or other change, and the performance of the modified aerofoil is then estimated using known methods—for example CFD programs, wind tunnel testing and so on. The trial and error approach may be continued until a suitable compromise between aerofoil performance and leading edge radius for attachment line transition prevention is achieved. Furthermore, the above iteration procedure may be repeated for a range of angles of attack of the aerofoil, and for a range of Reynolds numbers as required or desired, defining the laminarization limits of newly designed swept airfoil with respect to AL-transition (see FIG. 20(b)).

In one particular example of aerofoil 100, designated herein as aerofoil SNLF-18.5, was designed for providing at least some features of swept NLF wing sections according to at least some embodiments of the invention, and for evaluation thereof. The aerofoil geometry of aerofoil SNLF-18.5, and its two-dimensional aerodynamic characteristics, evaluated with the help of MSES code on 2-D basis (Refs. 2-3), are illustrated in FIGS. 6(a) to 9, illustrating the geometrical concept and adopted aerodynamic design principles in development of SNLF-aerofoils.

The following may be noted:

The maximum thickness ratio of the SNLF-18.5 aerofoil is $(t/c)_{max}$=18.5%, which is a common requirement of increased volume for wing internal fuel and systems installation in development of inboard stations of flying wings.

Small leading edge radius of r~0.55% of the chord was adopted for this evaluation in order to study the possibility of extension of laminarization limit due to AL-transition to domain of high Reynolds numbers. It is to be noted that in contrast, for specified thickness ratio, the leading edge radius of standard NACA aerofoils is about 2-4% of the chord (FIG. 5).

Aerofoil SNLF-18.5 was designed for the following conditions:

$$M_{design}=0.45, Re_{design}=15*10^6, C_{l\ design}=0.45, C_{m\ 0} \sim 0$$

Reflex camber shape of the aerofoil (FIG. 6(a)) was adopted to provide zero lift pitching moment close to zero (common with designs of tailless configurations, for example).

Design pressure distributions of aerofoil SNLF-18.5 (FIG. 6(b)) show strong accelerating pressure gradient at the leading edge of the wing section, followed by moderate flow acceleration at the mid-portion of the aerofoil. This was provided to prevent premature development of cross-flow instability of laminar boundary layer on swept wing and ensure extended laminarization limit with respect to TS-instability.

Figure 8:
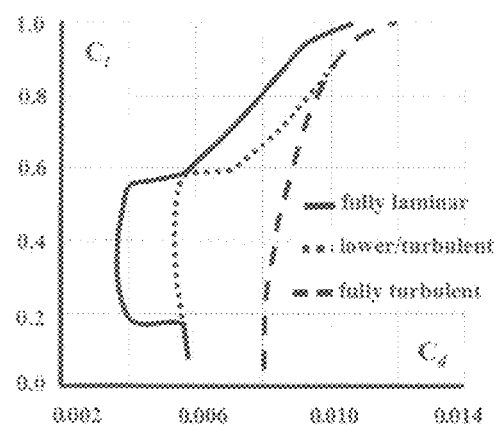
FIG. 8 illustrates effects of laminarisation of example aerofoil SNLF-18.5 at M=0.45, Re=15*10$^6$, using MSES code [Refs. 2, 3].
Figure 8:
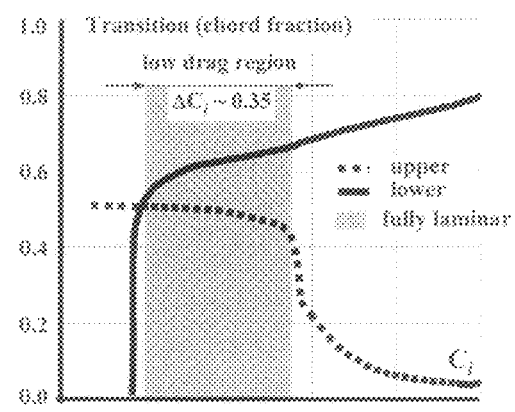
Figure 9:
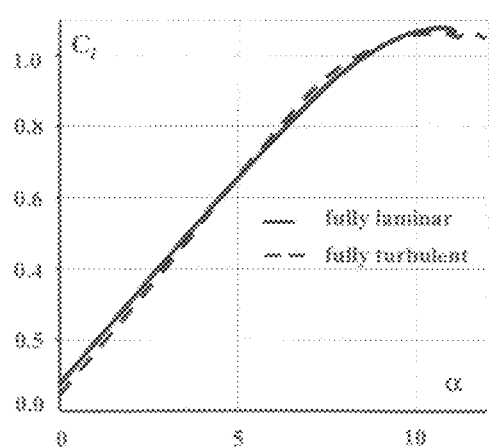
FIG. 9 illustrates effects of leading edge protection region of example aerofoil SNLF-18.5 at M=0.45, Re=15*10$^6$, using MSES code.
Figure 9:
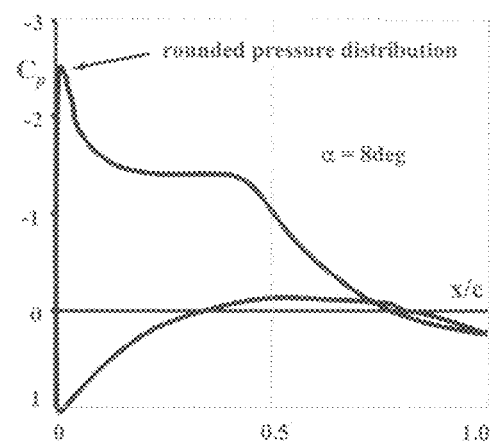

A protection area or region at the forward portion of the aerofoil (gradual decrease of surface curvature above small leading edge radius—see FIG. 7(a) and FIG. 7(b)) was provided for prevention of fast flow acceleration at the leading edge and formation of sharp suction peak with increasing angle of attack. Design for rounded pressure distributions at the forward portion of the aerofoil were found to be beneficial in increasing the load-carrying capabilities and in providing improved maximum lift characteristics (FIG. 9). Overall, the profiled leading edge based on a relatively small leading edge radius ensured sufficient range of lift coefficient for low-drag flight as illustrated in FIG. 8.

According to aspects of the invention, estimation of aerofoil characteristics on a two-dimensional basis allows fast evaluation of different design options, geometrical shaping of AL-radius region and protection area, design for extended laminarization of upper/lower surfaces of the aerofoil and verification of sensitivity to contamination effects.

Figure 10:
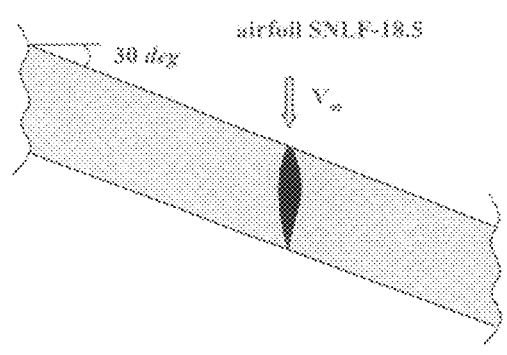
FIG. 10 illustrates typical streamwise pressure distributions based on example aerofoil SNLF-18.5 at M=0.45, Re=15*10$^6$, $C_l$=0.3, Λ=30° using VSAERO code.
Figure 10:
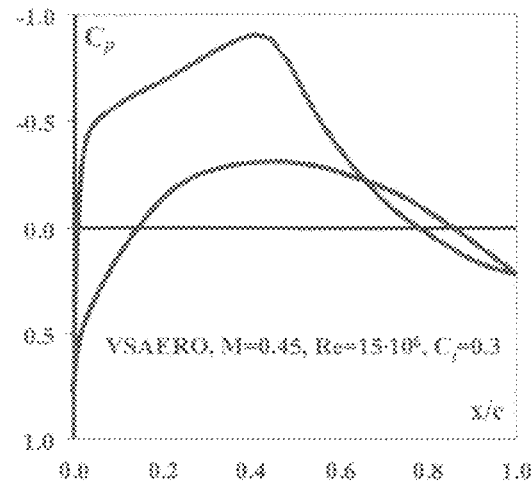

In the aforementioned example, evaluation of laminar-turbulent transition due to cross-flow instability and attachment line transition was performed for the case of an infinite swept wing, based on example aerofoil SNLF-18.5 as the definition station in streamwise direction, and using VSAERO code for calculations of pressure distributions (FIG. 10, Ref. 8). The results of this evaluation are summarized in FIGS. 11 to 19. This includes presentation of the guidelines for design of swept aerofoils with reduced sensitivity to amplification of cross-flow instability at required range of lift coefficients, evaluation of sweepback and Reynolds number effects, estimation of laminarization limits due to cross-flow instability and comparison with a previously designed cross-flow aerofoil (Refs. 4, 5, 9). Evaluation of attachment line transition was performed using calculated values of local leading edge radius at attachment line location (measured locally normal to the leading edge) and based on $\bar{R}$=245 for attachment line transition prediction (see FIGS. 20(a) to 21(b)).

Figure 11:
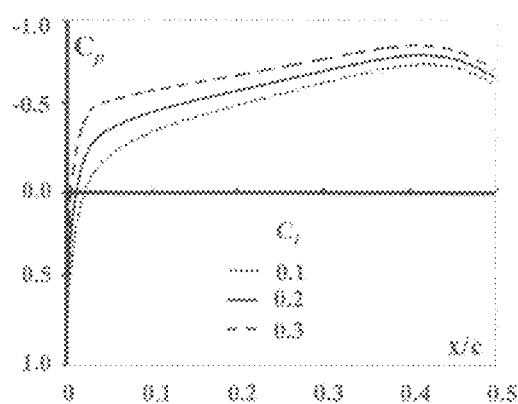
FIG. 11 illustrates development of CF-instability at different lift coefficients of example aerofoil SNLF-18.5 at M=0.45, Re=15*10$^6$, Λ=30°.
Figure 11:
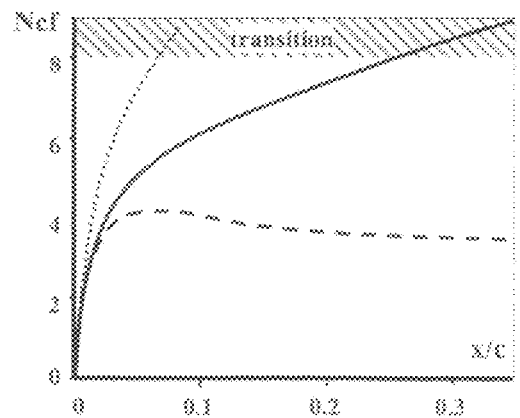
Figure 12:
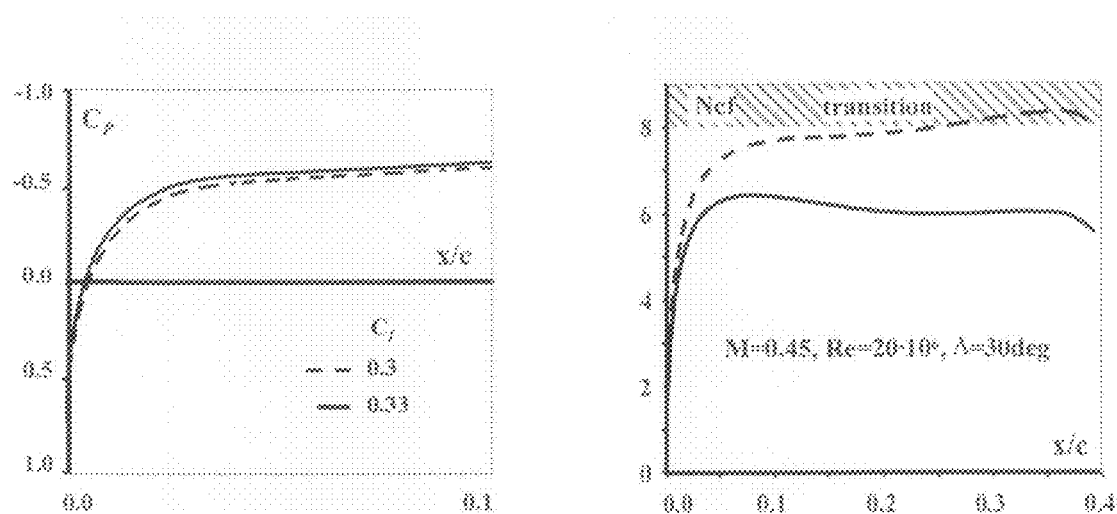
FIG. 12 illustrates development of CF-instability in strong accelerating pressure gradient of example aerofoil SNLF-18.5 Re=20*10$^6$, Λ=30°.
Figure 13:
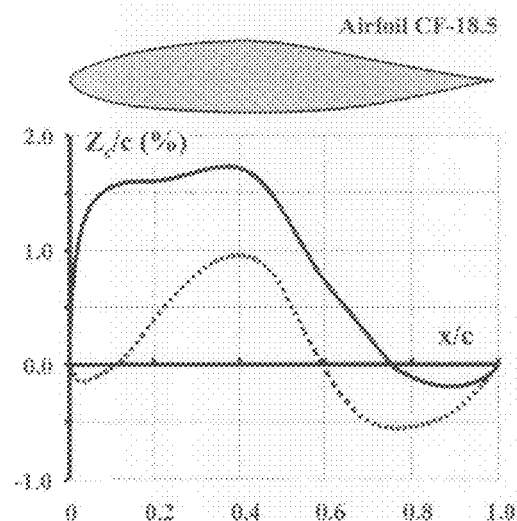
FIG. 13(a) illustrates the geometric profile and camber fraction of example aerofoil CF-18.5.
FIG. 13(b) illustrates 2D design pressure coefficient obtained with the aerofoil of FIG. 13(a), and compares the pressure coefficients obtained with the SNLF 18.5 aerofoil of FIGS. 6(a) and 6(b).
Figure 13:
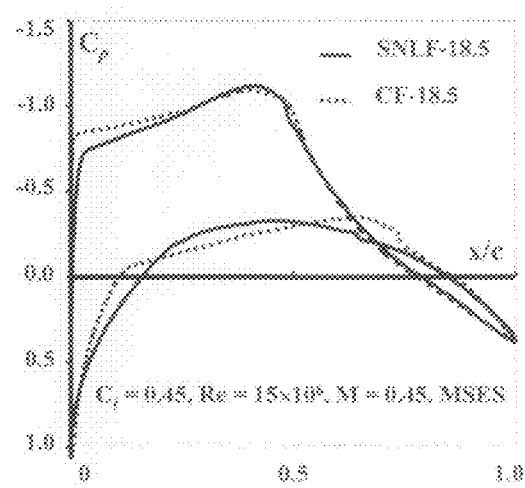
Figure 14:
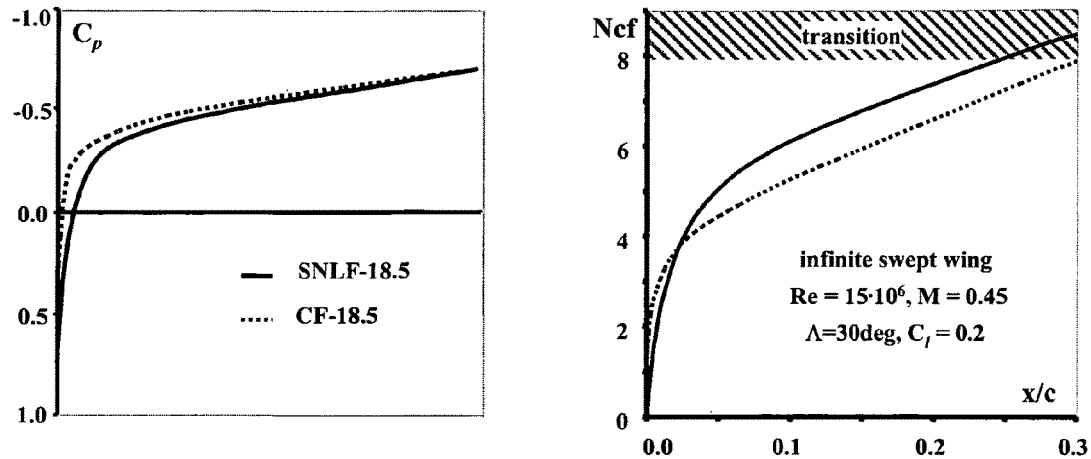
FIG. 14 compares development of CF instability of aerofoil CF-18.5 and aerofoil SNLF-18.5, at $C_l$=0.2.
Figure 15:
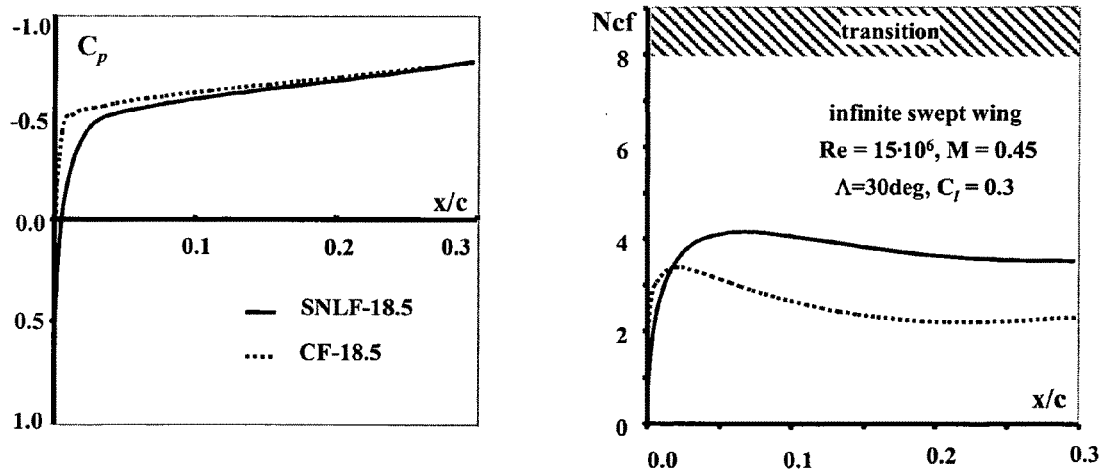
FIG. 15 compares development of CF instability of aerofoil CF-18.5 and aerofoil SNLF-18.5, at $C_l$=0.3.
Figure 16:
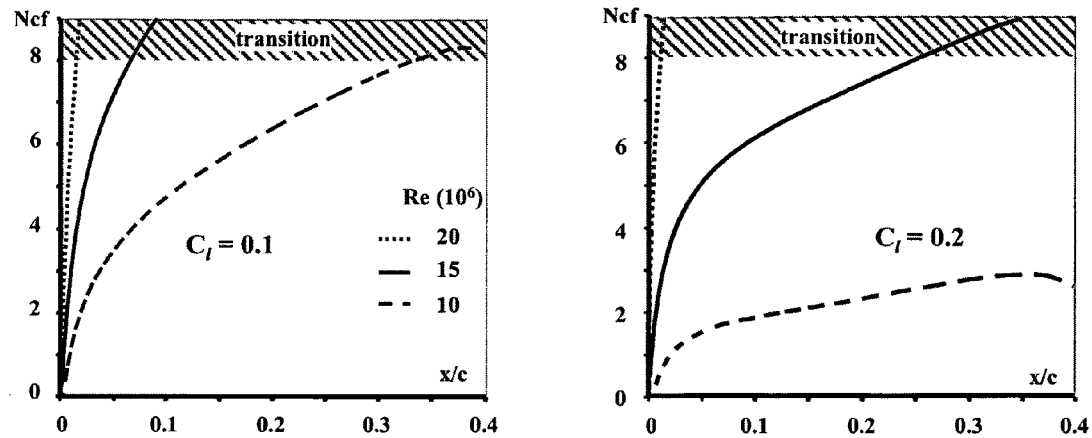
FIG. 16 illustrates CF instability/Reynolds effect of aerofoil SNLF-18.5, at M=0.45, Λ=30°, for $C_l$=0.1 and $C_l$=0.2.
Figure 17:
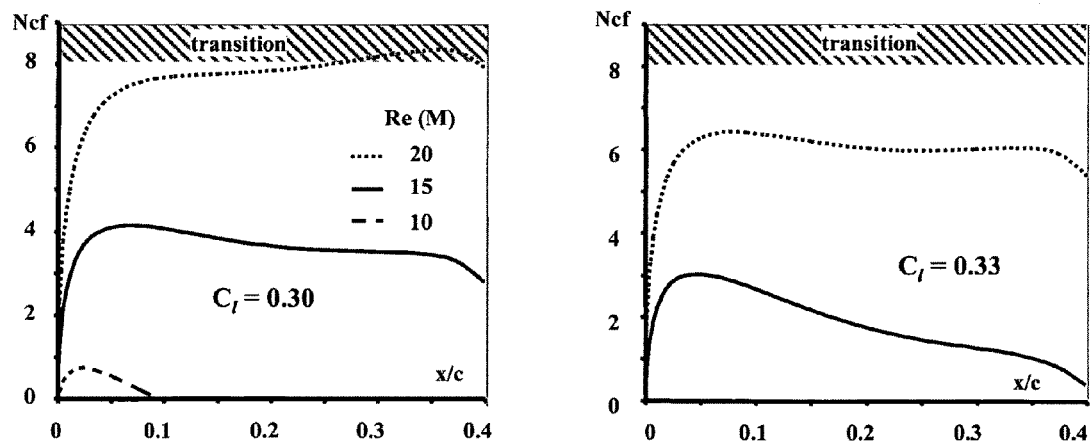
FIG. 17 illustrates CF instability/Reynolds effect of aerofoil SNLF-18.5, at M=0.45, Λ=30°, for $C_l$=0.3 and $C_l$=0.33.
Figure 18:
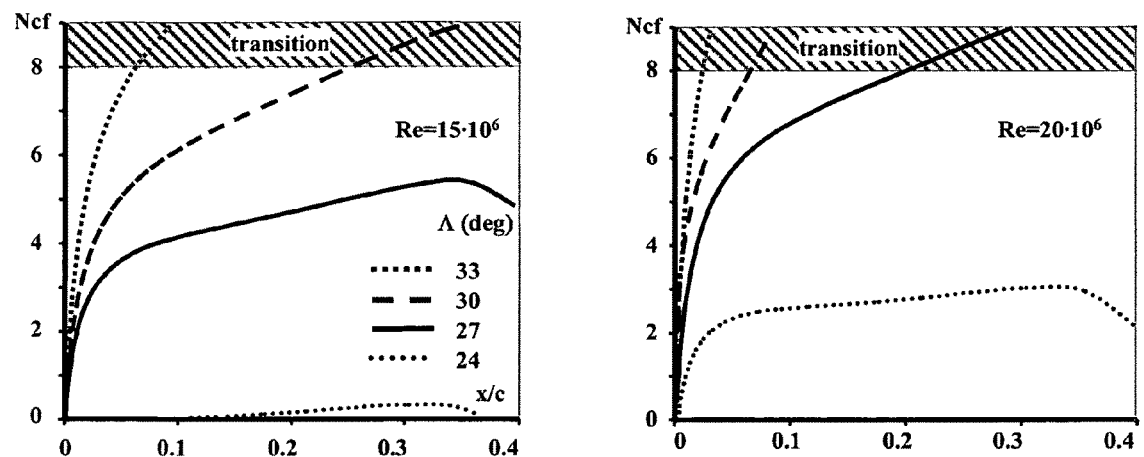
FIG. 18 illustrates CF instability/sweepback effect of aerofoil SNLF-18.5, at M=0.45, $C_l$=0.2, at Re=15*10$^6$ and Re=20*10$^6$.
Figure 19:
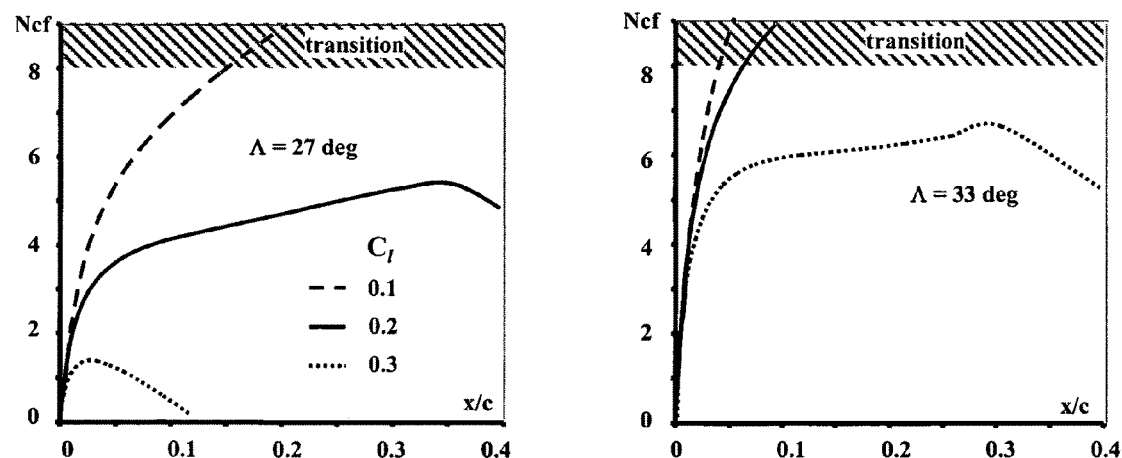
FIG. 19 illustrates CF instability/sweepback effect of aerofoil SNLF-18.5, at M=0.45, Re=15*10$^6$, at Λ=27° and Λ=33°.

The following may be noted:

Strong accelerating pressure gradient at the leading edge of the aerofoil prevents premature development of cross-flow instability of laminar boundary layer and transition to turbulent flow at the forward portion of aerofoil's upper surface. This is illustrated in FIGS. 11 and 12, showing pressure distributions and resulting development of cross-flow amplification factor for the different lift coefficients at Re=15*10$^6$, M=0.45 and wing sweep-back of $\Lambda$=30°. It may be seen, that at a lift coefficient of interest (for example $C_l$~0.3), there is a decay in development of cross-flow instability of laminar boundary layer. This was achieved by the shaping of the leading edge of the aerofoil (providing a corresponding combination of the small leading edge radius and protection area) and due to angle of attack effect of zero pitching moment aerofoils.

Development of cross-flow instability on upper surface of a SNLF-type aerofoil, in particular the SNLF-18.5 aerofoil, was compared with characteristics of a particular CF-type aerofoil, referred to herein as aerofoil CF-18.5, the latter having been specially designed by the Assignee for reduced sensitivity to amplification of cross-flow waves at the relatively high Reynolds numbers (FIGS. 13(a) to 15), and having a thickness to chord ratio of 18.5 as well [Refs. 4, 5]. The performed analysis, shows a small advantage of CF-type aerofoil with respect to cross-flow instability relative to the corresponding SNLF-type aerofoil. However, such an advantage may not be sufficient for providing a leading edge geometry that, on the other hand, produces an unfavorable distribution of local leading edge radius with respect to attachment line transition, which may adversely affect aerofoil laminarization with respect to attachment line transition. In contrast to the CF-type aerofoil, the SNLF-type aerofoil, provides acceptable combined laminarization limits, and also provides adequate cross-flow stability.

Figure 20:
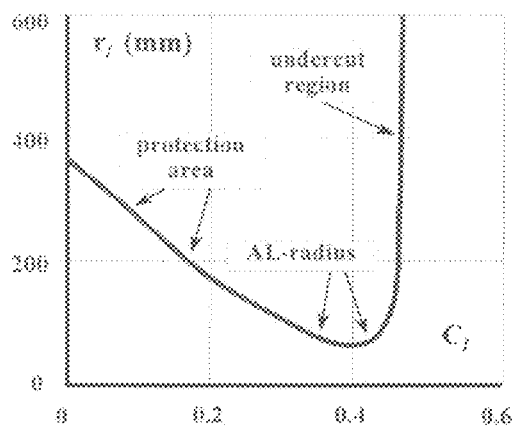
FIG. 20(a) and FIG. 20(b) respectively illustrate local leading edge radius distribution and resulting AL-limit, for aerofoil SNLF-18.5, at M=0.45, Λ=30° and chord 10m.
Figure 20:
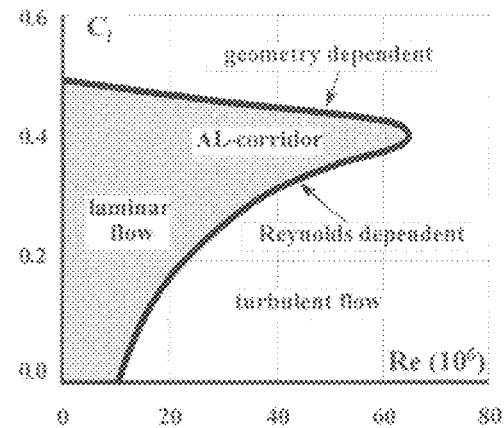
Figure 21:
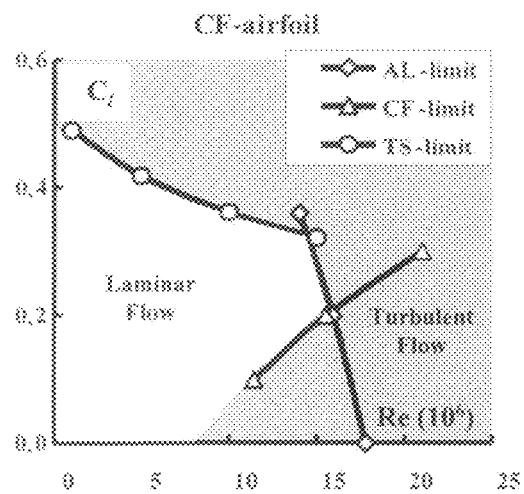
FIG. 21(a) and FIG. 21(b) respectively illustrate combined laminarization limits for aerofoil CF-18.5 and aerofoil SNLF-18.5, at M=0.45, Λ=30°.
Figure 21:
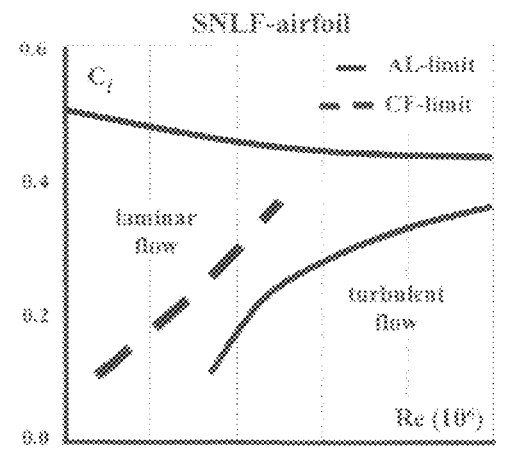
Figure 22:
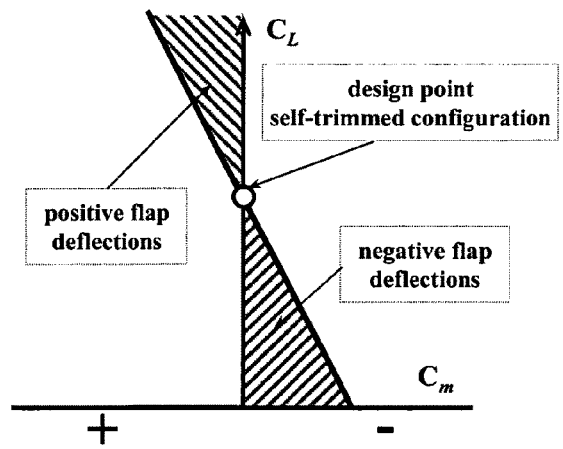
FIG. 22(a) and FIG. 22(b) schematically illustrate typical pitching moment curves and lift coefficient curves, respectively, for an unstable aircraft configuration.
Figure 22:
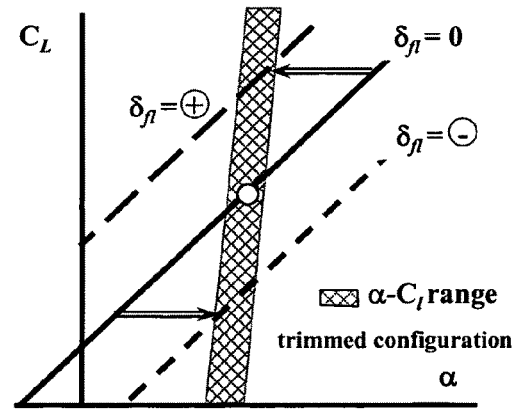

The small leading edge radius of the SNLF-type aerofoil helps to extend the attachment line limit to high Reynolds numbers. Referring to FIG. 20 (b) in particular, flow Laminarization at high Reynolds numbers was achieved for a narrow range of lift coefficients (referred to herein as "AL-corridor") thus enabling low drag operation of swept wings based on the SNLF aerofoil at high Reynolds numbers of over 60*10$^6$ while providing a lift coefficient $C_l$ of about 0.4.

Local leading edge radius at the attachment line location for SNLF-type aerofoil is plotted in FIG. 20(a) versus sectional lift coefficient of an infinite swept wing. With increasing angle of attack, the attachment line of SNLF-type aerofoil moves rapidly towards the upstream portion of the pressure surface (also referred to herein as the undercut region of the aerofoil), and thus at increasing angles of attack (higher lift coefficients) the attachment line limit tends to be a geometry-dependent characteristic. On the other hand, at lower angles of attack (and corresponding small lift coefficients), the protection region of SNLF-type aerofoil helps to moderate the variation of local radius with decreasing angle of attack, thus at decreasing angles of attack (lower lift coefficients) the attachment line limit tends to be more dependent on sectional Reynolds number (see FIG. 21(a), FIG. 21(b)).

Combined laminarization limits of SNLF-type aerofoil are presented in FIG. 21(a), FIG. 21(b) relative to the characteristics of CF-type aerofoil. In contrast to the CF-type aerofoil, laminarization limits of the SNLF-type aerofoil are constrained by cross-flow instability of the laminar boundary layer. Nevertheless, specific design and adjustment of leading edge radius to yield the required envelope of Reynolds numbers, lift coefficients and actual cross-flow limit of specific SNLF-type aerofoils may produce acceptable and compatible laminarization limits of swept NLF wing sections with specific sweepback angle.

Referring for example to FIG. 20(b), the "AL-corridor" that may be generated with SNLF-type aerofoils may put a limit on allowable range of lift coefficients for low drag flight, the range depending on the specific aerofoil and wing design. In some cases, this may reduce flexibility of mission adjustment to optimum cruising/loitering flight, capability to compensate for the weight variation of long endurance configurations by adjustment of flight conditions and ability to provide acceptable directional stability characteristics of sideslipping swept wing. Nevertheless, a swept wing based on aerofoils according to the invention may be designed to take advantage of low drag at lift coefficients and Reynolds numbers of the "AL corridor", while performing with higher levels of drag elsewhere, these higher levels of drag still being acceptable, and in many cases not very different from the levels expected with corresponding conventional aerofoils having conventional, larger leading edge radii.

On the other hand, and according to another aspect of the invention, a swept natural laminar flow wing is provided with an unstable aircraft configuration, for effectively extending the range of allowable lift coefficients at high Reynolds numbers, thus widening the "AL corridor" for the aircraft, providing the option of wing adaptivity to variation of flight conditions.

Referring to FIGS. 22(a) and 22(b), common pitching moment characteristics of an unstable aircraft include positive pitching moment induced at lift coefficients greater than the design point lift coefficient ($C_{1\ design}$) (self-trimmed configuration), and negative pitching moment induced at lift coefficients less than at the design point. For example, the design point may include zero pitching moment ($C_m$=0) at loiter conditions ($C_{1\ loiter}$). Accordingly, positive elevator deflections are required for trimming lift coefficients above $C_{1\ design}$, and at small lift coefficients, i.e., below $C_{1\ design}$, the aircraft configuration is trimmed by negative deflection of the elevator. The combination of negative static margin and self-trim condition at primary design point lead to design for negative $C_{m0}$ that is beneficial for lift-carrying capabilities of the wing. The self trimmed configuration at design lift coefficient does not require deflections of control surfaces for trimming the aircraft in the longitudinal plane and is a standard design feature of conventional and tailless configurations.

On the other hand, and as illustrated in FIG. 22(b) in particular, executing a positive flap deflection at lift coefficients greater than $C_{1\ design}$ can provide an increase of the lift coefficient while not affecting the angle of attack by much. Said differently, the unstable aircraft configuration enables the lift coefficient to be increased from $C_{1\ design}$ by providing corresponding positive flap deflections, while maintaining the angle of attack more or less at the level corresponding to that of the lift coefficient $C_{1\ design}$ at zero flap deflection, and continues to provide a trimmed configuration at these conditions. A similar, converse, situation is provided for lower values of lift coefficient and negative flap deflections, mutatis mutandis. Thus, as the schematic presentation of lift coefficient curves for positive/negative flap deflections in FIGS. 22(a) and 22(b) illustrate, the trim characteristics of the unstable aircraft configuration effectively enable to decrease the range of angles of attack required for providing a desired variation of lift coefficients.

Figure 23:
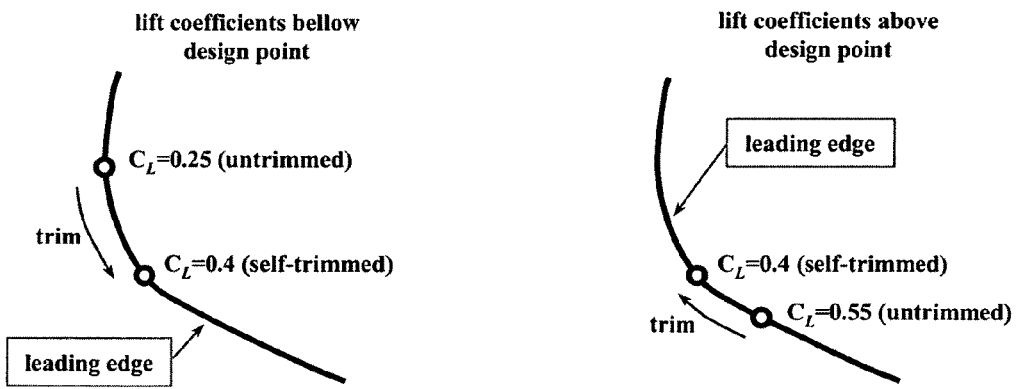
FIG. 23 illustrates schematically effective attachment line travel along the leading edge for trimmed/untrimmed unstable aircraft configuration.
Figure 24:
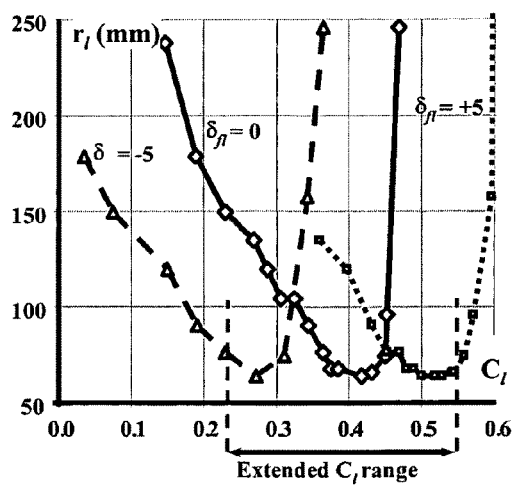
FIG. 24(a) illustrates variation of local leading edge radius at attachment line with lift coefficients, obtained for flap deflections of −5°, 0° and +5°, and the effective extended range of lift coefficients; and in FIG. 24(b) the corresponding expansion of the "AL-corridor" at high Reynolds numbers is illustrated.
Figure 24:
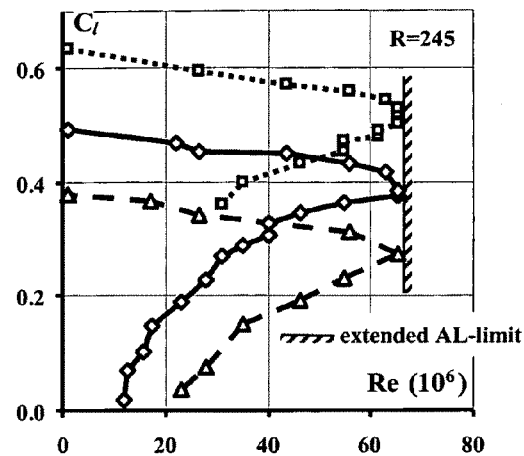

By using flap deflection to achieve the desired level of lift coefficient, while not substantially increasing the angle of attack, a direct beneficial effect is provided regarding the location of the attachment line on the leading edge, limiting the range of travel of the attachment line with respect to that required in an untrimmed aircraft at higher angles of attack that provide comparable lift coefficient. As FIG. 23 illustrates, the location of the attachment line for untrimmed lift coefficients above and below the primary design point (corresponding to $C_{1\ design}$), when obtained at respective high and low angles of attack (and zero flap deflection), effectively migrate towards the location at the self trimmed configuration by providing an appropriate positive or negative flap deflection, respectively, instead of corresponding changes in angles of attack.

Calculated values for local leading edge radius at attachment line for the different lift coefficients are plotted in FIG. 24(a) for three different flap deflections $-\delta_{flap}$=0, +5 deg, and -5 deg, based on aerofoil SNLF 18.5. This figure illustrates that while at each flap deflection the leading edge radius for maintaining laminarisation and preventing attachment line transition corresponds to a relatively narrow range of lift coefficients in each case, the effective overall range of lift coefficients that may be achieved while maintaining laminar flow can be considerably expanded by providing the lift by way of flap deflection in a trimmed configuration, rather than by changing the angle of attack in an untrimmed configuration. In FIG. 24(b), the corresponding expansion of the "AL-corridor" is illustrated, based on attachment line parameter of $\overline{R}$=245 at high Reynolds numbers, and the expansion of the "AL-corridor" includes a summation of all the lift coefficient ranges, obtained at the range of flap deflections.

Figure 25:
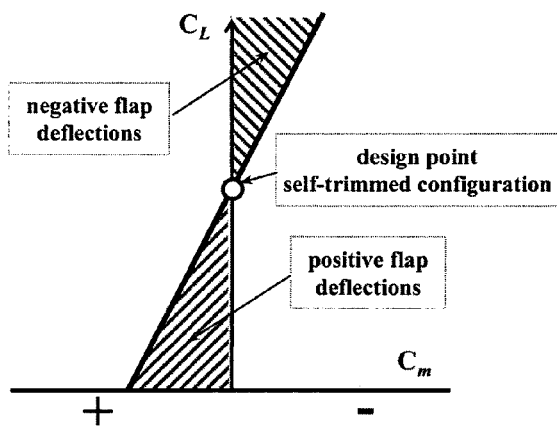
FIG. 25 schematically illustrates typical pitching moment curves and lift coefficient curves for a stable aircraft configuration.
Figure 25:
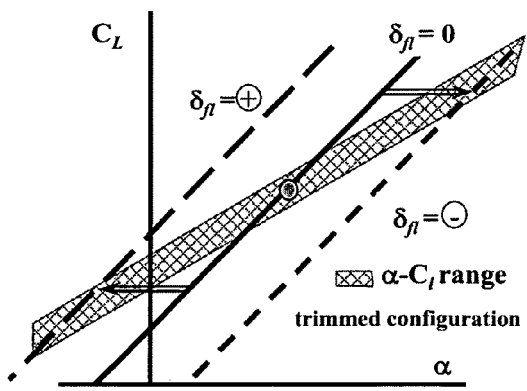
Figure 26:
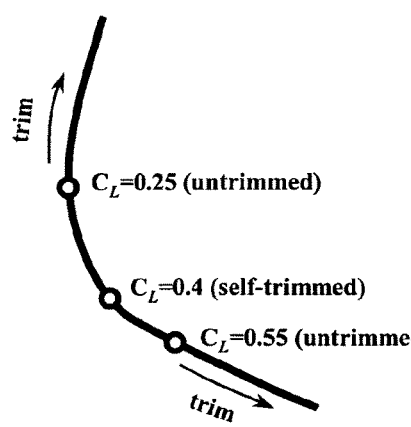
FIG. 26 illustrates schematically effective attachment line travel along the leading edge for trimmed/untrimmed stable aircraft configuration, and variation of local leading edge radius at attachment line with lift coefficients, obtained for trimmed and untrimmed stable aircraft configuration.
Figure 26:
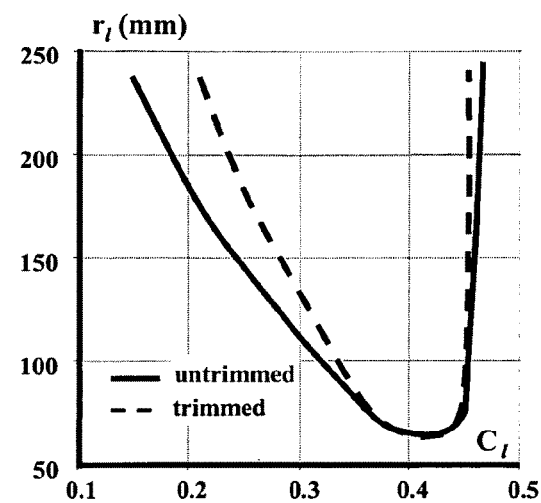

By way of contrast, FIGS. 25 and 26 illustrate that for stable aircraft configurations, flap deflections with trimming have the opposite effect to that of unstable configurations, and the attachment line tends to move further away from the location of the attachment line at the self trimmed configuration, which may affect adversely the range of lift coefficients for low drag flight.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

REFERENCES

1. Abbott I. H. and Von Doenhoff A. E., "Theory of Wing Sections", Dover Publications Inc., N.Y., 1959.
2. Drela, M., "Newton Solution of Coupled Viscous-Inviscid Multi-Element Airfoil Flow", AIAA 90-1470, AIAA Fluid Dynamics, Plasmodynamics and Laser Conference, Seattle, Wash., June 1990.
3. Drela, M., "A User's Guide to MSES V2.6", MIT Computational Aerospace Laboratory, May, 1994

4. Steinbuch M., Marcus B. and Shepshelovich M., "Development of UAV Wings—Subsonic Designs". 41$^{st}$ Aerospace Sciences Meeting and Exhibit, Reno, Nev., 6-9 Jan. 2003.
5. Steinbuch M. and Shepshelovich M., "Development of UAV Wings—Transonic Designs". 43$^{rd}$ Aerospace Sciences Meeting and Exhibit, Reno, Nev., 10-13 Jan. 2005.
6. Poll, D. I. A.: "Transition in the Infinite Swept Attachment Line Boundary Layer". The Aeronautical Quart., Vol. 30, 1979, pp. 607-629.
7. Viswanath, P. R., Mukund, R., "Relaminarization on Swept Leading Edges under High-Lift Conditions", 42$^{nd}$ Aerospace Sciences Meeting and Exhibit, Reno, Nev., 5-8 Jan. 2004.
8. Nathman, J. K., "VSAERO User's Manual", Analytical Methods, INC, Redmond, Wash., May 2003.
9. Steinbuch M., Shepshelovich M. and Tumin, A., "Laminarization of Swept Wing—the Design Aspects". 36$^{th}$ Israel Annual Conference on Aerospace Science, February, 1996.

The invention claimed is:

1. An aircraft, comprising a longitudinally unstable configuration and swept wings, wherein each of said swept wings comprises a plurality of aerofoils, each said aerofoil having a leading edge, a chord dimension and a thickness dimension, each said aerofoil being configured for preventing attachment line transition in conditions of laminar flow over the swept wing for at least a predetermined first range of lift coefficients at a second range of Reynolds numbers, wherein at least one said aerofoil has a thickness dimension (t) greater than about 13% of said chord dimension (c), and said leading edge radius (r) less than 1% of said chord dimension.

2. Aircraft according to claim 1, wherein said leading edge comprises a local leading edge radius that is not greater than about 0.5% of said chord dimension.

3. Aircraft according to claim 1, wherein at least one said aerofoil has a thickness dimension (t) between about 5% and about 13% of said chord dimension (c), and a leading edge radius (r) that is related to said thickness dimension (t) and said chord dimension (c) by the expression:

$$(r/c) \leq [(t/c) - 0.05]/8.$$

4. Aircraft according to claim 1, wherein said leading edge has a curvature that extends about 60° with respect to a center of said curvature.

5. Aircraft according to claim 1, further comprising a protection region on a suction surface of at least one said aerofoil and joined to said leading edge downstream of said leading edge, wherein said protection region is configured for preventing or minimizing fast flow acceleration at the leading edge and formation of a sharp suction peak with increasing angle of attack for the aerofoil.

6. Aircraft according to claim 5, wherein said protection region extends downstream of said leading edge by about 30° with respect to a center of said curvature.

7. Aircraft according to claim 1, wherein said swept wings have a sweep angle Λ, and a limiting value for a local leading edge radius (r) at attachment line location is determined from the expression:

$$\overline{R} = \sin \Lambda \sqrt{\frac{Re}{2\cos \Lambda} \times \frac{r}{c}}$$

wherein $\overline{R}$ is the attachment line parameter, Re is a minimum flight Reynolds number and c is the aerofoil chord dimension of the respective said aerofoil, said attachment line parameter $\overline{R}$ having a value not greater than a critical value corresponding to onset of turbulent flow along the attachment line.

8. Aircraft according to claim 7, wherein a surface of the swept wings have a predetermined critical roughness, and wherein $\overline{R}$ has a value of about 245.

9. Aircraft according to claim 7, wherein a surface of the swept wings have a generally polished finish, and wherein $\overline{R}$ has a value of between about 500 and about 600.

10. Aircraft according to claim 1, wherein said aircraft is configured for extending said first range of said lift coefficients at said second range of Reynolds numbers by providing suitable deflections of wing flaps and maintaining the aircraft in a trimmed condition.

11. Aircraft according to claim 10, wherein said aircraft is configured for providing said extended range of said lift coefficients while maintaining an angle of attack of the wing generally close to the angle of attack at a design lift coefficient for the aircraft.

12. A method for operating an aircraft, comprising:
providing said aircraft with a longitudinally unstable configuration and swept wings, wherein each of said swept wings comprises a plurality of aerofoils, each said aerofoil having a leading edge, a chord dimension and a thickness dimension, each said aerofoil being configured for preventing attachment line transition in conditions of laminar flow over the swept wing for at least a predetermined first range of lift coefficients at a second range of Reynolds numbers, wherein at least one said aerofoil has a thickness dimension (t) greater than about 13% of said chord dimension (c), and said leading edge radius (r) less than 1% of said chord dimension; and
flying said unstable aircraft at low drag conditions at least at said second range of Reynolds numbers.

13. Method according to claim 12, further comprising extending said first range of said lift coefficients by providing suitable deflections of wing flaps comprised in said swept wings and maintaining the aircraft in a trimmed condition for said second range of Reynolds numbers, and flying said unstable aircraft at low drag conditions at least at said second range of Reynolds numbers.

14. Method according to claim 13, wherein said first range of said lift coefficients is extended while maintaining an angle of attack of the wing generally close to the angle of attack at a design lift coefficient of said aircraft.

15. An aircraft, comprising a longitudinally unstable configuration and swept wings, wherein each of said swept wings comprises a plurality of aerofoils, each said aerofoil having a leading edge, a chord dimension and a thickness dimension between about 5% and about 13% of said chord dimension, each said aerofoil being configured for preventing attachment line transition in conditions of laminar flow over the swept wing for at least a predetermined first range of lift coefficients at a second range of Reynolds numbers, wherein said leading edge comprises a local leading edge radius that is not greater than 0.5% of said chord dimension.

16. An aircraft, comprising a longitudinally unstable configuration and swept wings, wherein each of said swept wings comprises a plurality of aerofoils, each said aerofoil having a leading edge, a chord dimension and a thickness dimension, each said aerofoil being configured for preventing attachment line transition in conditions of laminar flow over the swept wing for at least a predetermined first range of lift coefficients at a second range of Reynolds numbers, wherein at least one said aerofoil has a thickness dimension (t) greater than about 15% of said chord dimension (c), and said leading edge radius (r) less than 1% of said chord dimension.

* * * * *